Figure 1:
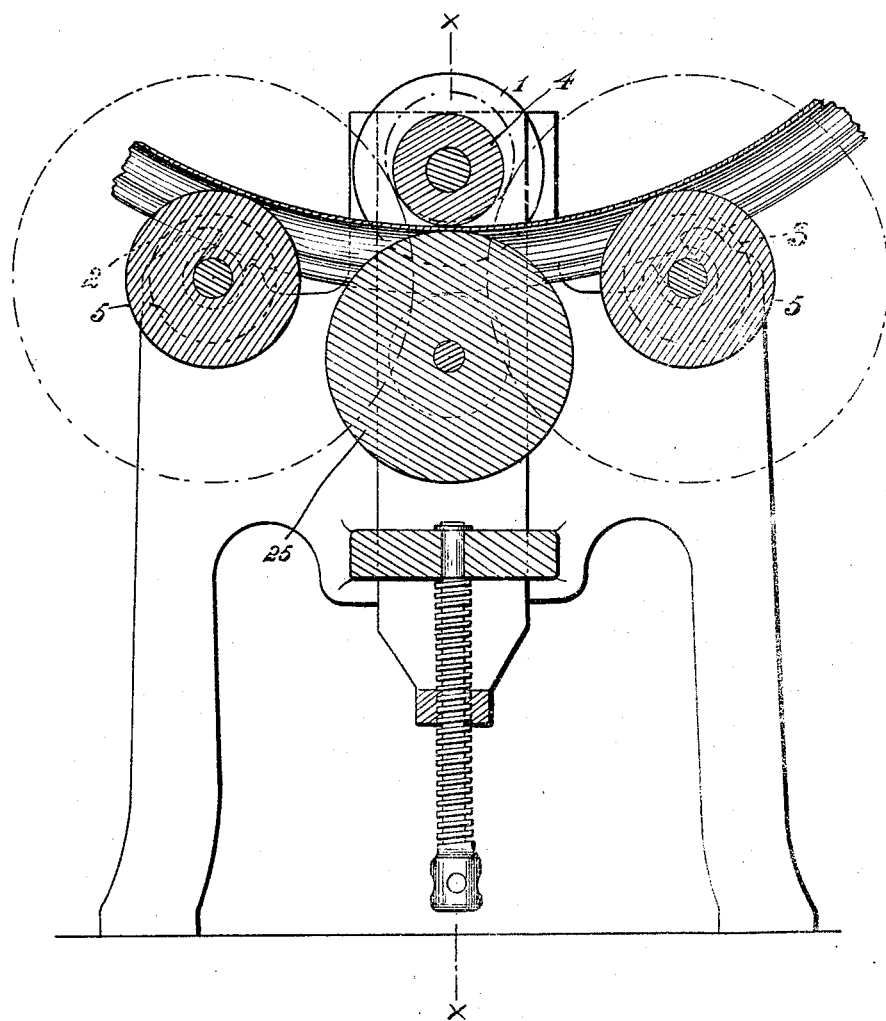

No. 774,108. PATENTED NOV. 1, 1904.
S. T. RICHARDSON & R. PRICE.
MACHINE FOR BENDING TROUGH SECTION METALLIC WHEEL RIMS.
APPLICATION FILED OCT. 31, 1903. RENEWED OCT. 4, 1904.
NO MODEL. 4 SHEETS—SHEET 1.

Witnesses.
Inventors

No. 774,108. PATENTED NOV. 1, 1904.
S. T. RICHARDSON & R. PRICE.
MACHINE FOR BENDING TROUGH SECTION METALLIC WHEEL RIMS.
APPLICATION FILED OCT. 31, 1903. RENEWED OCT. 4, 1904.
NO MODEL. 4 SHEETS—SHEET 2.
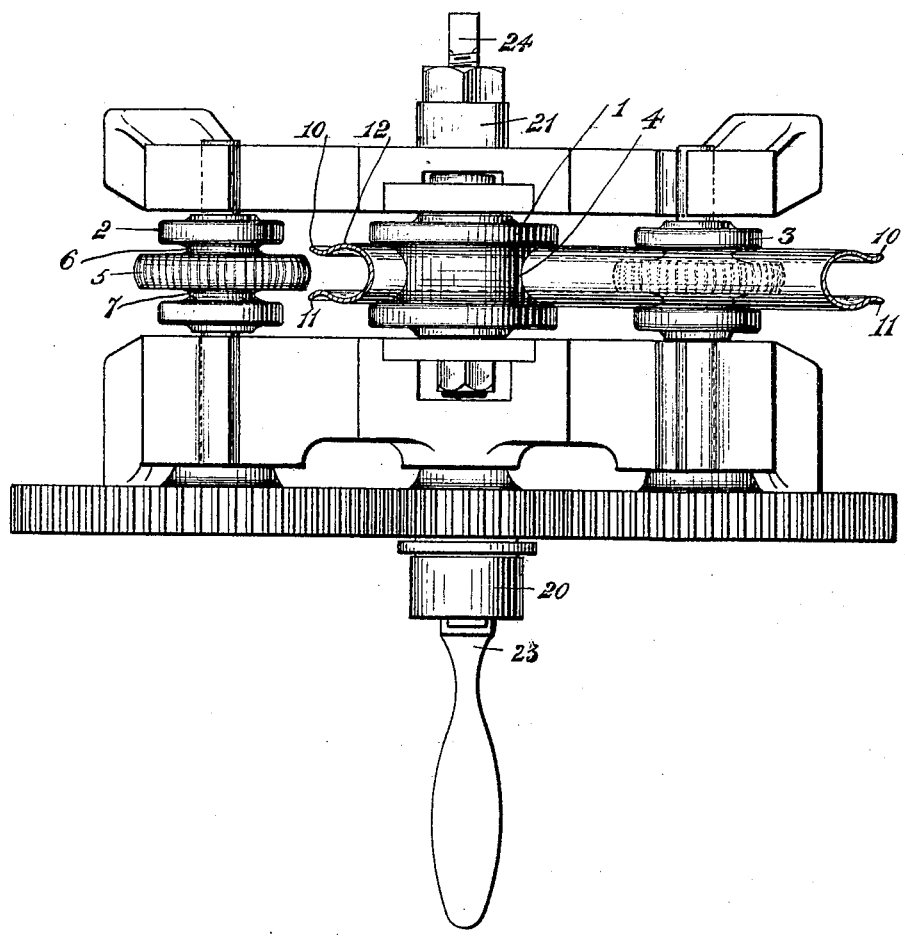

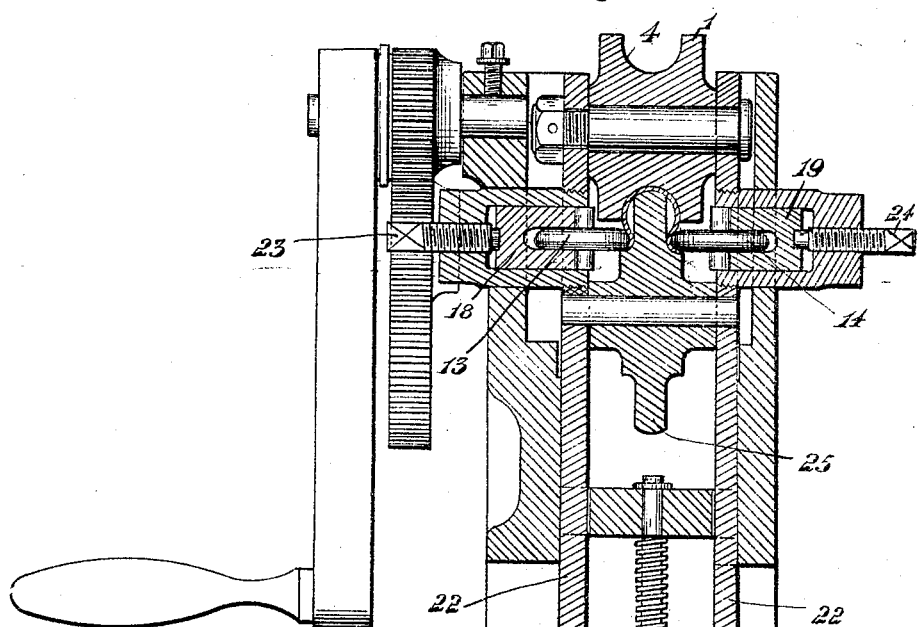
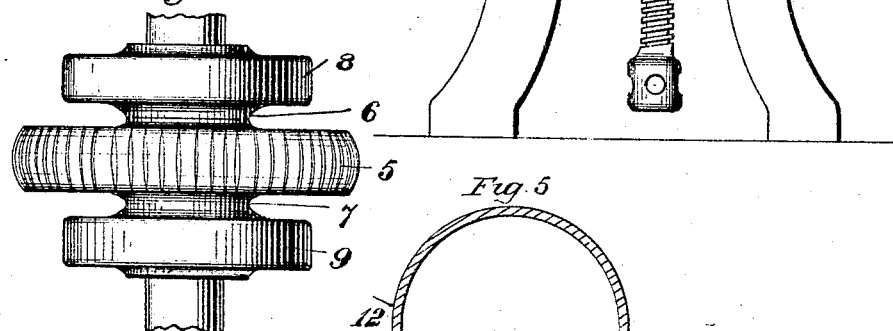
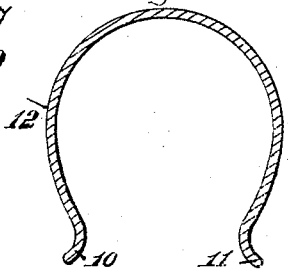

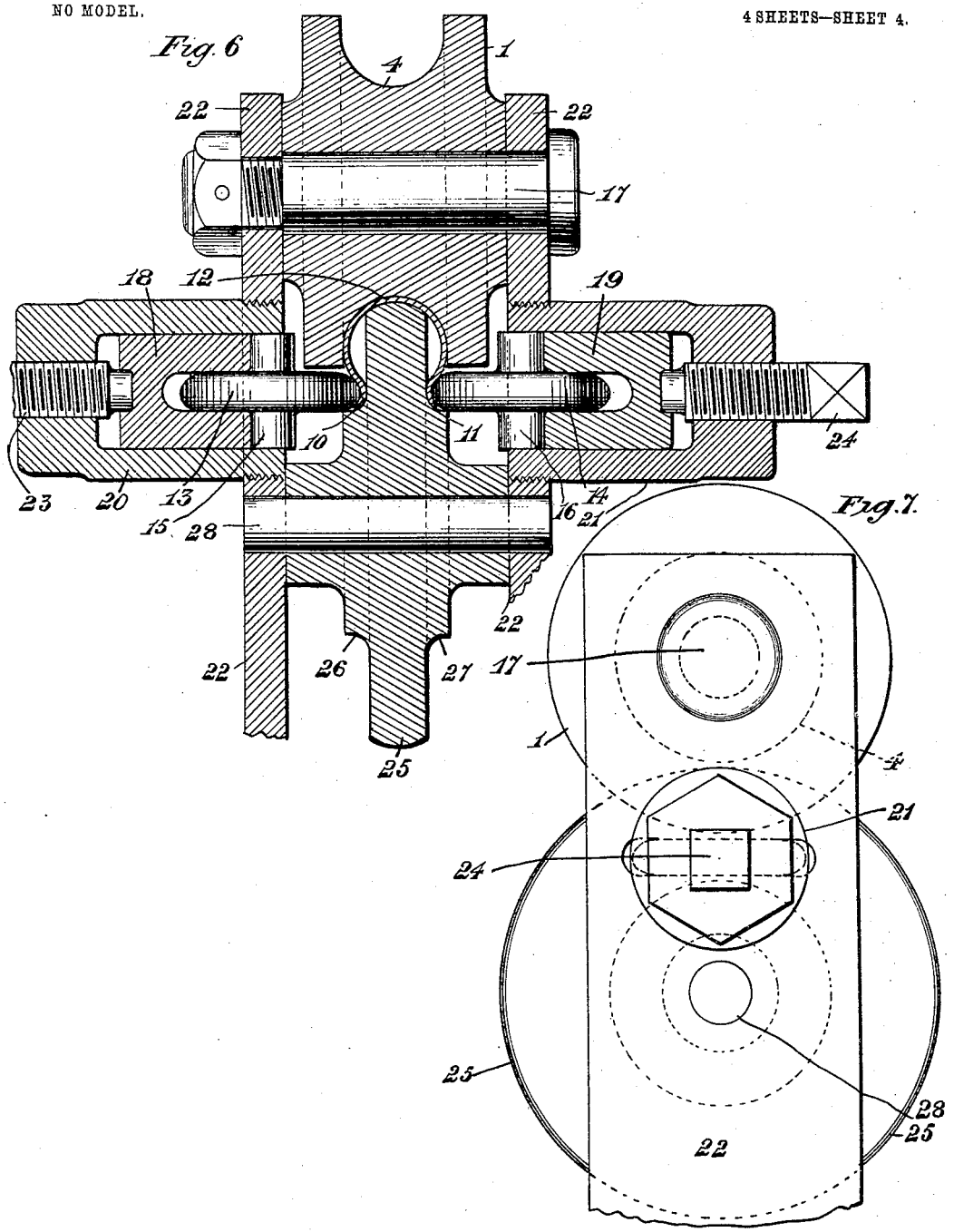

No. 774,108.                                              Patented November 1, 1904.

UNITED STATES PATENT OFFICE.

SAM THOMAS RICHARDSON AND RICHARD PRICE, OF BIRMINGHAM, ENGLAND.

MACHINE FOR BENDING TROUGH-SECTION METALLIC WHEEL-RIMS.

SPECIFICATION forming part of Letters Patent No. 774,108, dated November 1, 1904.

Application filed October 31, 1903. Renewed October 4, 1904. Serial No. 227,162. (No model.)

*To all whom it may concern:*

Be it known that we, SAM THOMAS RICHARDSON and RICHARD PRICE, coach-wheel manufacturers, subjects of His Majesty the King of Great Britain and Ireland and of the British dominions beyond the seas, Emperor of India, residing at 3a Rea street, in the city of Birmingham, England, have invented certain new and useful Improvements in Machines for Bending Trough-Section Metallic Wheel-Rims, of which the following is a specification.

This invention has reference to machinery of the kind described in the specification of our prior Letters Patent of the United States of America, No. 677,142, dated June 25, 1901, for improvements in machinery or apparatus for bending certain kinds of metallic wheel-rims. Heretofore the two sides of the trough-section of the said metallic wheel-rims have been inclined to the periphery which has been the narrowest part of the trough. In practice we find that these two edges or terminations of the sides of the trough at the periphery of the wheel-rim are in some cases apt to chafe and wear the india-rubber tire which is situated between them, and therefore, as in some other wheel-rims for pneumatic tires, we find it is better to turn the extreme edges of the trough outwardly, so that the two sides of the mouth of the trough are slightly rounded where they touch the sides of the pneumatic tire, and thus the chafing and wear of the sides of the tire are entirely or to a great extent obviated.

Our present invention consists of the herein-described improvements in the said machine to enable it to form or bend the trough-section metallic wheel-rim to the required shape—namely, with the terminations of the two sides of the mouth of the trough slightly rounded outwardly.

Our invention is illustrated by the accompanying drawings, in which—

Figure 1 is a sectional side elevation of a trough-section wheel-rim-bending machine embodying our present invention. Fig. 2 is a plan of the said machine. Fig. 3 is a cross-sectional elevation of the said machine on line X X of Fig. 1. Fig. 4 shows one of the rollers of the said machine on an enlarged scale. Fig. 5 is a cross-section of the wheel-rim on an enlarged scale. Fig. 6 is a cross-sectional elevation, on a larger scale, of some of the rollers and parts of the machine which are also shown by Fig. 3; and Fig. 7 is a side elevation of the parts represented in Fig. 6.

The same numerals of reference indicate the same parts in all the figures.

In carrying out this invention we employ three bending-rolls, (marked, respectively, 1, 2, and 3,) corresponding with the three bending-rolls A, B, and C described in the specification of our prior Letters Patent above referred to, of which the roll 1 is made with a groove 4 to fit against the rounded outside of the trough-section bar, and two rolls 2 and 3 are each made with a flange 5 to take inside the trough against the bottom of the same to keep the trough open and with two grooves 6 and 7 and flanges 8 and 9 to support the sides of the trough and prevent them from bulging outwardly during the bending process. In our present invention the grooves 6 and 7 in these rolls 2 and 3 are turned to correspond with the outwardly-curved terminations 10 and 11 of the sides of the trough-section rim 12 and the widened mouth of the same, so as to maintain the proper curved shape of these sides, and in order to act upon the rounded sides of the trough near these rounded terminations 10 and 11 of the sides we provide two outside rollers 13 and 14, arranged with their axes 15 16 at about right angles to the axis 17 of the first or central roll 1 and carried by blocks 18 19, which are adapted to slide in guides 20 21, which are fixed to the frame 22, which carries the axis 17 of the central roll 1, and these two small side rolls 13 14 are set up by screws 23 24, which are screwed into the ends of the guides 20 21 and act against the ends of the blocks 18 19, so that by these screws 23 24 the rolls 13 14 can be pressed against the outside of the rounded terminations 10 11 of the trough-section rim 12, as shown in Fig. 6, so as to insure the desired form of them being maintained. In order to afford a solid resistance for these side rolls 13 14 to press against, we provide another roll, 25, which is situated between them and immediately underneath the first or central roller 1 and takes inside the trough-section bar or rim 12 and is shaped at 26 27 to correspond with the mouth of the trough, so that when the trough-section bar 12 of the improved section above described and shown in Fig. 5 is being bent by the machine this section will be properly maintained. The roll 25 turns on an axis 28, which is carried by the frame 22, which carries the first or central roll 1.

The trough-section bar of the section shown by Fig. 5, which we operate upon, can either be drawn on a draw-bench, with the terminations 10 11 of the sides opened and widened outwardly, as above described, to correspond with the finished wheel-rim, or the said trough-section bar may be drawn of the same section as that shown in the specification of our prior Letters Patent, No. 677,142, above referred to—namely, with the sides straight to the mouth of the trough—and then when this bar has been passed through the machine made with the improved and additional rolls 1, 2, 3, 13, 14, and 25, as above described, these rolls will impart the proper rounded shape to the terminations of the sides of the trough at the same time that the bar is bent and curved to the circular form to make the wheel-rim.

What we claim as our invention, and desire to secure by Letters Patent, is—

In a machine for bending a trough-section strip of the kind herein referred to into a trough-section wheel-rim, the combination of the six rolls 1, 2, 3, 13, 14 and 25 of which the roll 1 is made with a groove 4 to fit against the rounded outside of the trough, the two rolls 2, 3 which are each made with a flange 5 to take inside the trough and against the bottom of the same and keep the trough open and with the two grooves 6, 7 and flanges 8, 9 to support the sides of the trough, the two rolls, 13, 14 which are each made to bear against the outside of the rounded extremities of the trough and the roll 25 also arranged to bear against the said rounded extremities and to take inside the trough to form a solid resistance for the side rolls, 13, 14 to press against, said rolls being arranged and operating in the manner substantially as hereinbefore described.

In witness whereof we have hereunto set our hands in presence of two witnesses.

SAM THOMAS RICHARDSON.
RICHARD PRICE.

Witnesses:
CHARLES BOSWORTH KELLEY,
THOMAS JOHN ROWE.